United States Patent Office 3,514,996
Patented June 2, 1970

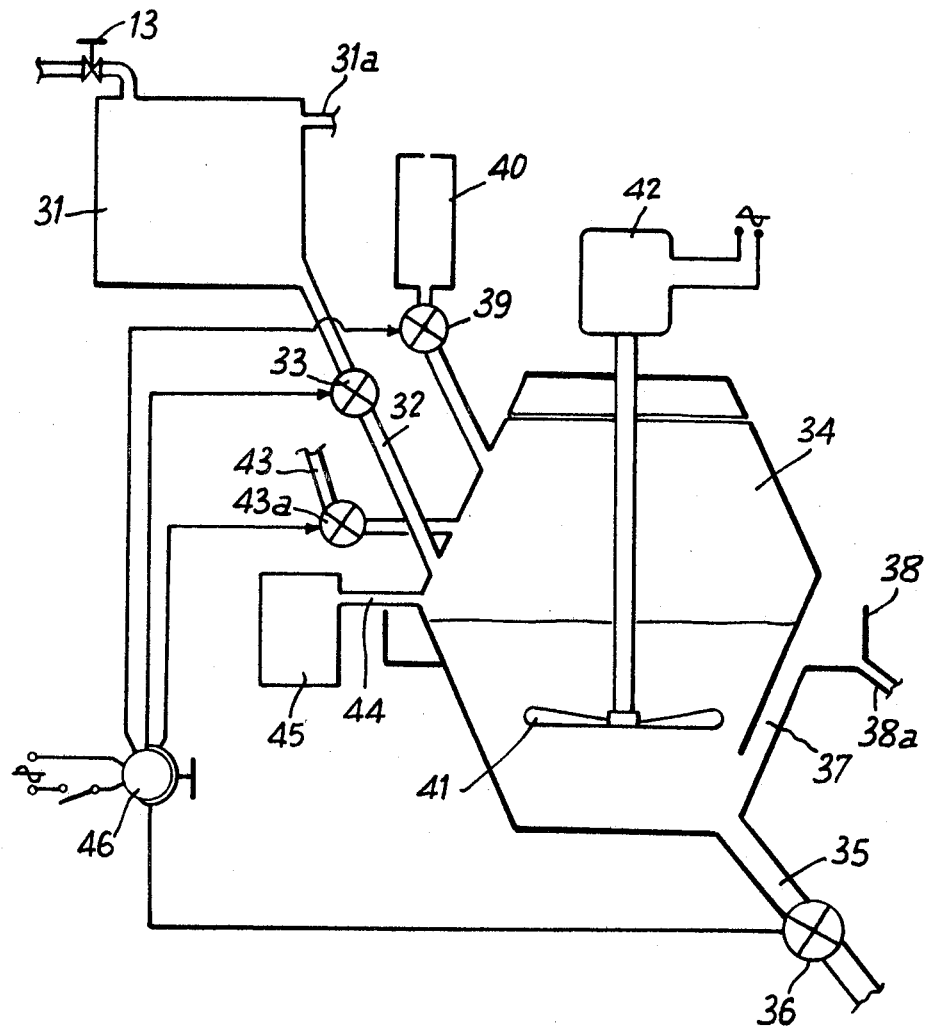

3,514,996
APPARATUS FOR GEOLOGICAL SURVEYING
Robert Coustau, Sauvagnon, France, assignor to Societe Anonyme dite: Societe Nationale des Petroles d'Aquitaine Courbevoie, a corporation of France
Filed Sept. 30, 1968, Ser. No. 763,629
Claims priority, application France, Oct. 18, 1967, 124,941
Int. Cl. E21b *49/00*
U.S. Cl. 73—153
6 Claims

ABSTRACT OF THE DISCLOSURE

Various fundamental operations of geological surveying, which up to now have been carried out manually, are carried out automatically by means of novel apparatus arranged to receive the mud or slurry derived from a drilling operation. In this way various physico-chemical parameters of the mud or slurry are measured.

---

The present invention relates to a method of measuring physico-chemical parameters of mud or slurry derived from a drilling operation and to apparatus for use in such measurement. The method and apparatus of the invention enable core samples to be taken continuously and automatically during a drilling operation.

When I refer to the taking of core samples I mean the operation which consists, during the drilling of a mine or of a petroleum well, in recording by means of the mud or slurry, certain related parameters both as regards the nature of the geological formations traversed and the fluids contained in the said formations.

This operation has so far not been effected automatically. The analyses have always been effected in respect to samples taken manually and transcribed independently of one another, and this frequently causes divergences between the collected data.

The present invention overcomes this disadvantage by providing a method and apparatus for automatically measuring the parameters of the mud.

The method according to the present invention consists in taking at an adjustable rate a continuous fraction of the drilling mud in circulation, in subjecting this mud fraction to a predetermined speed control comprising at least the negation of the vertical speed of the mud current, in collecting the waste entrained by the mud, in transferring this waste at predetermined moments into a water circulation washer, in collecting the washed waste in a sampling device and in using the current of mud from which the waste has been extracted for determining characteristics of the said mud.

The arrangement according to the present invention comprises a flow meter situated in the discharge circuit of the drilling mud, a sampling circuit for a fraction of the mud flow situated downstream of the flow meter, the said circuit being extended by a conduit of variable section, the axis of symmetry of which is vertical, the said conduit, enclosed in a vessel terminating in the vicinity of the junction plane of two connected volumes forming the said vessel, the upper volume, surmounted by a preferably cylindrical sleeve, carrying at its upper part an overflow of which the outlet is connected to a first chamber comprising two outlet orifices, the first connected to a second chamber and situated at a level such that the level of the mud in the first chamber is flush with the said orifice, the second connected to a variable flow cock permitting the height of the mud level to be adjusted to the chosen value, the lower volume being connected at its base to a cylindrical conduit closed by an automatically operated valve connecting the said conduit to a washing device for the waste, the base of which, closed by a second automatically operating valve, opens above an automatic extraction device.

According to one feature of the invention, the surface of the outlet section of the variable section conduit is between 5 and 100 times the section of the waste withdrawal circuit and preferably between 10 and 20 times this surface.

According to another feature of the invention, the speed of the mud opposite the outlet section of the variable section conduit is adjusted between 0.1 and 10 cm./s. and preferably to the region of 3 cm./s.

According to another feature of the invention, the flow of mud in the withdrawal circuit is adjustable by using a pump of which the delivery rate is adjustable.

In one embodiment of the invention, a pressure detector is positioned near the base of the cylindrical sleeve and is subjected to the weight of the column of mud placed above it, the said detector thus delivering a signal which is proportional to the specific gravity of the mud.

In another embodiment of the invention, a conductivity probe which permits the conductivity of the mud to be established is situated just below the detector.

In another embodiment of the invention, a temperature-measuring probe is placed at the level of the conductivity probe.

In another embodiment of the invention, a device permitting the extraction of gas from the mud is placed in the first chamber, the said device preferably being formed by a magnetostrictive coil which ensures an efficient stirring of the mud circulating in the said chamber.

In another embodiment of the invention, a predetermined volume of mud freed from waste is intermittently acted upon by means of an acid and the resultant carbon dioxide is measured by a physical method, preferably by an infra-red analyser, the calibration of this analyser being according to an internal standard.

In another embodiment of the invention, a source of ultra-violet light is placed above the second chamber, the light falling on the free surface of the mud at a selected angle, and the light of fluorescence is received on a photoreceptive device, the said second chamber being light-tight.

In another embodiment of the invention, the valve placed on the cylindrical conduit connected to the lower volume is controlled by means of a signal delivered from the drilling advance diagram and then, after a certain time, the valve placed at the base of the automatic waste washer and also the automatic advance of the buckets which receive the waste after washing are also controlled.

In a preferred embodiment of the arrangement according to the invention, two or more embodiments as defined above are combined in a single apparatus.

The invention will be best understood from the following description of embodiments of the arrangement, the said description being illustrative by the accompanying figures.

FIG. 2 represents the diagram of the intermittent calcimeter.

Figure 1:
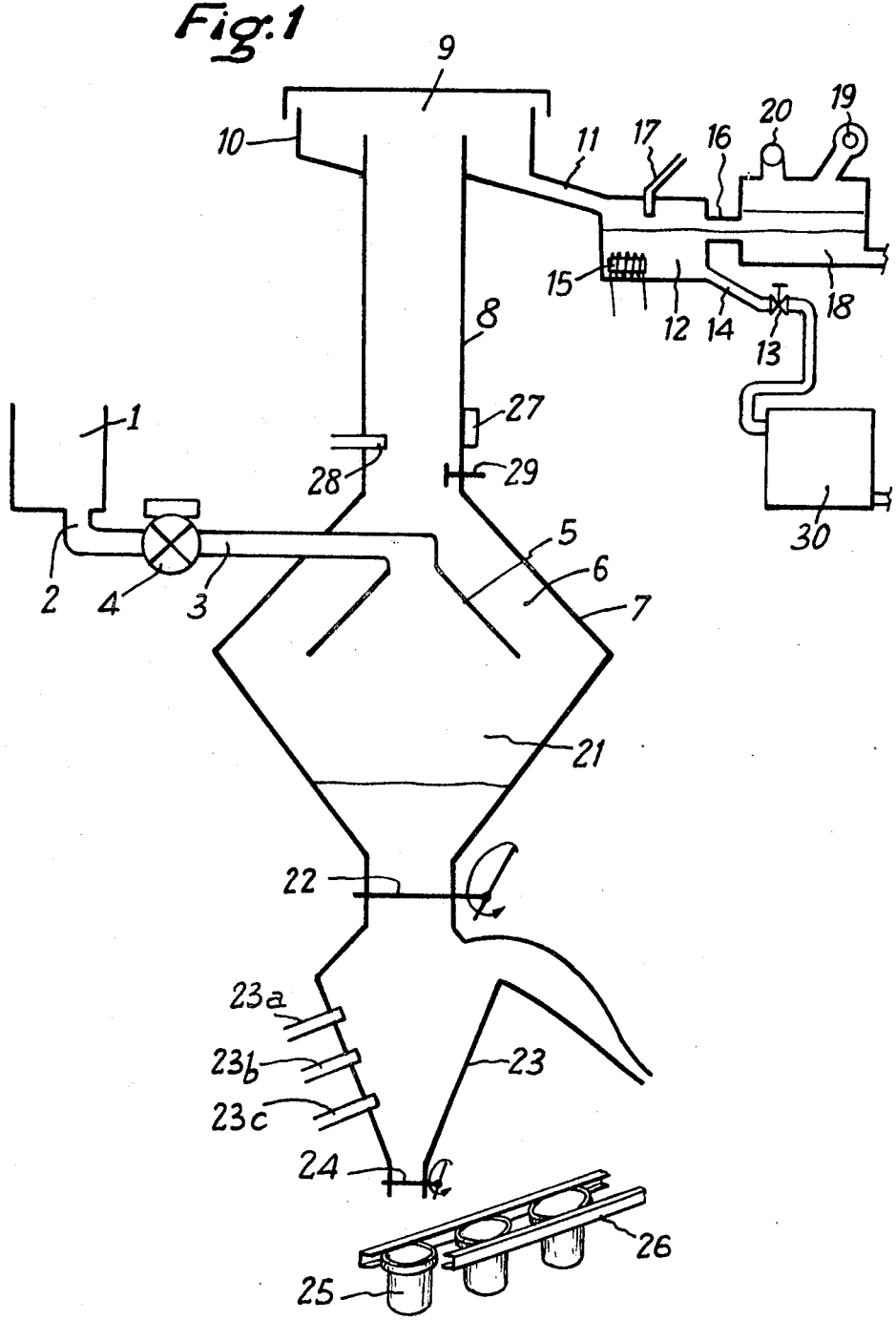
FIG. 1 represents the diagram of the arrangement.

The chute connecting the well head to the mud storage tank is shown at 1. The section of this chute, represented at 1, is situated upstream of the vibrators frequently used for separating the waste or debris of the mud. An opening 2 is formed either in the bottom of this chute or on the side of the latter and is connected to a circuit 3 by means of a constant delivery pump 4. The said pump causes the withdrawn mud to circulate through a variable section conduit 5 of conical form. The base of the cone is situated at the lower part of this conduit. The speed of the mud thus decreases in inverse proportion to the surface of the conduit. As the speed of the mud decreases, the waste which until then is entrained by the mud has a tendency to settle, more especially as the speed vector of the mud is cancelled out and changes direction at the moment of passage of the mud at right angles with the outlet section of the conduit 5. The flow of mud then ascends in an annular space 6 which is disposed between the conical conduit 5 and the surface 7 limiting the upper part of the biconical vessel. The speed of the mud increases and then becomes constant inside the cylindrical casing 8, which has an opening 9 by which the mud circuit is connected with the open air. The mud then drops into an overflow 10 which is of annular form and flows through a conduit 11 to reach a chamber 12 in which its level is regulated to a constant value by means of a cock 13 arranged in the discharge conduit 14, which is connected to an apparatus 30 which will be described in connection with FIG. 2. A vibrator 15 subjects the mud contained in the chamber 12 to a very energetic stirring, which in particular permits the separation of the gases and oils which until then were contained in the mud. The mud overflow flows through the conduit 16, while an orifice located at 17 and connected to a withdrawal conduit permits the desorbed gases to be sent towards an analyser of known type; the mud then reaches the chamber 18, in which it is subjected to an ultra-violet radiation from a lamp 19, the re-emission radiation being received by the photo-multiplier 20.

The waste material settles on leaving the variable section conduit 5 and is collected in the lower part of the biconical vessel. This waste material is retained by the automatic opening valve 22, which is actuated by a signal coming from the drilling indicators. This signal is for example delivered by a contactor placed on one of the pulleys of the device for measuring the advance movement. When the signal releases this valve, the waste falls into an automatic washer 23, where it is subjected to different streams of air, whereby it is possible for the mud entrained at the time of settlement to be eliminated from the said waste. This washer is described in French Pat. 1,458,314.

The waste material then takes up a position in order of decreasing fineness at the bottom of the washer 23, after having been washed by the jets coming from 23a, 23b, 23c, as described in the arrangement which forms the subject of French Pat. No. 1,458,314. This washer is provided with an automatically closing valve 24, which is controlled by the same signal as the valve 22, a predetermined time lag being imposed on the opening of the valve 24, this time lag corresponding to the washing time.

When this valve 24 is opened, the washed and sorted material falls into a bucket 25 arranged on a distribution rail 26, the advance of the buckets being assured by the signal which controls the opening of the valve 22 or by a derived signal.

The operation of the arrangement as described above proceeds in the following manner:

The mud, on leaving the drilling, simultaneously contains waste material coming from the traversed formations and fluids which are contained in these said formations. A fraction of constant delivery of the mud circulating in the chute 1 is drawn off through the conduit 2. The quantity delivered by the pump can be under the control of the mud injection rate in the drilling, so as to obtain a quantity of waste material substantially independent of the speed of circulation of the mud.

On passing into the conduit 5, the mud loses its waste because of sedimentation, the vertical speed of the mud being cancelled out and changing in direction.

Once freed from its waste material, the mud ascends through the cylindrical conduit 8 and, as it flows, the pressure measuring detector 27 enables its density to be determined, the height of mud being kept constant.

The resistivity of the mud is likewise measured by a probe 28 and its temperature is measured by a thermo-electric couple, for example, 29. The delivery of the pump 4 is regulated in such a way that the surface 9 is stable. A pulsation damping means can be connected to the pump 4 so as to eliminate all disturbing vibrations.

The mud is then subjected to a violent agitation in the chamber 12 and the gases are drawn off and analyzed, either by chromatography or by infra-red analysis. The upper part of the mud frequently forms an emulsion, in which are assembled the traces of oil which the mud can contain. This emulsion passes into the chamber 18 and the hydrocarbons which can possibly be transported by the mud are detected by the fluorescence arrangement formed by the lamp 19 and the photo-multiplier 20. It is possible to arrange a device in the chambers 12 and 18 by which the traces of possible hydrocarbons can be concentrated by a known physical means. This device can for example be a tensioned belt, on which a powder wettable with hydrocarbons is deposited. The waste material contained in the vessel 21 falls into the washer 23 when the automatic closure valve 22 is opened. This valve can be opened on an order coming from the drilling, and in particular the opening of this valve can be under the control of the drilled length, that is to say, for example, this valve can be opened each time a length of 2 metres has been drilled. The waste materials thus withdrawn correspond, except for a delay, to the space which has just been drilled. This delay can be accurately calculated, knowing the speed of circulation of the mud in the drilling and the sedimentation conditions in the well. The waste materials are washed and then collected in the buckets 25. The advance of the buckets is synchronized with the opening of the valve 22. It is advantageous to use a pneumatic advance system.

This arrangement thus makes it possible automatically to collect the drilling waste as a function of the advance, ensuring an accurate sampling of the rocks with a view to determining the lithographic and physical characteristics of the traversed rock. It was observed during tests that the collected volume was always satisfactory, taking into account the sampling percentage, and in practice represented the volume of rock removed at the time of drilling.

FIG. 2 shows the apparatus which is indicated at 30 in FIG. 1.

The cock through which the degasified mud passes is seen at 13. This mud is stored in a tank 31 with an overflow 31a. This tank is provided with a conduit 32, along which is placed an automatically opening valve 33, controlled by a pneumatic system released by a micro-motor 46 driving a cam assembly. The starting of this micro-motor is effected by a contactor placed on the pulleys of the device for measuring the advance of the drilling. The conduit 32 opens into a reactor 34 provided with an outlet 35 and an automatically opening valve 36 controlled by the micro-motor 46. This reactor 34 has an overflow 37, as shown in FIG. 2, permitting a known and constant quantity of mud to be treated. The overflow is surrounded by a discharge system 38 and 38a. Opening into the reactor 34 is a conduit in which is placed an automatic valve 39 also controlled by the micro-motor 46, which permits the injection of a definite quantity of hydrochloric acid stored in the reservoir 40 into the reactor 34. The reactor 34 is also equipped with a blade-type stirrer device 41 which is rotated by the motor 42. An air inlet 43 is also provided, in which is arranged an automatically opening valve 43a controlled by the micro-motor 46. Finally, a discharge conduit for the gases of the reaction is shown at 44, this conduit opening into an infra-red analyser 45 which is regulated for the measurement of carbon dioxide.

The operation of this arrangement is as follows:

The drilling mud constantly reaches the tank 31. At an instant determined by the advance of the drilling, an order is sent to the micro-motor 46, this order starting up the said motor. By a system of cams which this motor drives, first of all the valve 33 is opened and then closed after a certain time. A certain quantity of mud passes from the tank 31 into the reactor 34, this quantity of mud being itself adjusted by the arrangement of the oveflow 37. The valve 39 is then opened and a certain calibrated quantity of hydrochloric acid falls into the mud, is mixed with the latter and causes the decomposition of the carbonates contained in the mud, with liberation of carbon dioxide. After a predetermined time, the valve 43 is opened. The air entering the reactor flushes the latter and drives off the liberated carbon dioxide through the conduit 44 towards the analyser 45. The cell of this analyser, of continuous type, enables the content of carbon dioxide in the flushing air to be measured; then, after a predetermined time, the valve 36 is opened, this permitting the discharge of the mud and bringing the apparatus into a state for carrying out a fresh analysis. It is to be noted that the speed of decomposition reaction of calcium carbonates and of double carbonates of calcium and magnesium, called dolomites, is different. The presence in the mud of a calcareous rock or a dolomite is very easily distinguished on the diagrams supplied by the analyser 45. This reaction is quantitative and permits an accurate measurement of the carbonates contained in the mud.

Another embodiment consists in positioning in series a battery of automatic washers at the outlet of the biconical withdrawal device as described above. This arrangement is advantageous in the case where the advance movements are rapid. It enables representative samples to be obtained with advance movements which are as fast as one metre per minute, this being a speed which is rarely attained.

This solution is employed particularly for drilling operations at sea, where more than ever the maximum advance is desirable. A battery of five washers is for example used. This permits correct samplings to be obtained with an advance of thirty metres per hour.

This method of automatic sampling is particularly recommended, if not essential, in the case of diamond drilling in small diameter and at great depth. Actually, it is difficult, if not impossible, to recover in this case the waste materials, which are very small and not very plentiful.

This method of sampling is in addition proved to be a very economical means of control, ensuring a representative sampling of the traversed formation and thus avoiding the frequent taking of core samples and ensuring a best economy of the drilling. The elimination of the very long operations at great depth ensures a very substantial reduction in the drilling cost, particularly with diamond tolls which work for 5 to 10 days without stopping.

This method of procedure also ensures the possibility of a sampling and an effective study of the fine sands and media which pass through the meshes of the vibrating screens, although this is impossible by the traditional means; marble, clay and marl formations, which are washed better when they are in suspension in the mud than when they have been agglutinated by the vibrating screen; during the traversing of zones which are called lost zones, when using a mud with sealing compounds and when the vibrators are made inoperative; in the case of drilling with foaming products, if care is taken to add a solution of saline water to the foam.

Other advantages of this apparatus are to ensure a withdrawal and automatic washing of the small pieces of waste material in the case of drilling with a small diameter to a great depth, which waste otherwise cannot be recovered; an automatic withdrawal in the case of very rapid advance movements and in addition an automatic withdrawal at a distance from the drilling apparatus, which is very useful in the case of drilling rigs at sea, where the bridge is very overcrowded and where access to the vibrators is difficult, the effluent falling into mud tanks which are always situated at a lower level; and a concentration in a single apparatus of several functions concerned with geological surveying.

I claim:

1. Apparatus for use in measuring physico-chemical parameters of mud or slurry derived from a drilling operation, characterised by a conduit for the flow of said mud or slurry discharged from a drilling bore, a flow-meter for measuring the flow of mud in said conduit, a passage downstream of said flow-meter for taking a sample of said mud or slurry, a conduit having a generally vertically axis, extending from said first-mentioned conduit and having a cross-section which varies symmetrically relatively to said axis, said variable cross-section conduit extending into a vessel comprising two enclosures connected together disposed one above the other and communicating with one another over a junction plane, said variable cross-section conduit terminating in said junction plane, whereby said vessel serves for settling material in said mud or slurry as said mud or slurry is discharged from said variable cross-section conduit, an outlet communicating with the upper part of the upper of said spaces for the discharge from said vessel of residue of said mud or slurry, a first chamber in which said mud is agitated to cause the release of absorbed gases therefrom, said chamber being connected to said outlet and having at least two outlet orifices, a second chamber equipped with hydrocarbon detecting means and communicating with one of said orifices, which orifice is situated to be at the level of said residue in said first chamber, a cock connected to the other of said orifices for adjusting said level in said first chamber, a washing device for washing said material settled in said vessel, two automatic valves controlling respectively the supply of said material from said vessel to said washing device and the discharge of said material from said washing device and means receiving material from said washing device.

2. Apparatus according to claim 1, characterised by a passage for the supply of said material from said vessel to said washing device, the cross-sectional area of said variable cross-section conduit, where it terminates in said junction plane, being between 5 and 100 times the cross-sectional area of said passage.

3. Apparatus according to claim 1, characterised by a passage connecting said upper space to said outlet, said passage being provided with a pressure detector, a conductivity measuring probe, and a temperature measuring probe.

4. Apparatus according to claim 3, characterised by said passage being provided by a cylindrical sleeve.

5. Apparatus according to claim 1, characterised by intermittently operating calcimetry means connected to said first chamber and comprising a constant volume chamber, means for supplying at least one calcimetry reactant and at least one flushing fluid to said constant volume chamber automatically and means for analysing the flushing fluid after flushing of said constant volume chamber.

6. An apparatus according to claim 5, wherein said analysing means comprises a quantitative gas analyser.

References Cited

UNITED STATES PATENTS

| | | | |
|---|---|---|---|
| 2,225,973 | 12/1940 | Brown et al. | 175—66 X |
| 2,289,687 | 7/1942 | Stuart | 73—153 X |
| 2,569,141 | 9/1951 | Bakels | 209—12 |
| 2,749,748 | 6/1956 | Slobod et al. | 73—153 |
| 2,923,151 | 2/1960 | Engle et al. | 73—153 |

JERRY W. MYRACLE, Primary Examiner

U.S. Cl. X.R.

73—53